(12) United States Patent  
Raghavendra et al.

(10) Patent No.: US 8,744,895 B2
(45) Date of Patent: Jun. 3, 2014

(54) METHOD AND SYSTEM FOR MANAGING A PLURALITY OF REGULATIONS, POLICIES AND RISKS

(75) Inventors: Prasanna S. Raghavendra, Bangalore (IN); Srinivasan Ranganathan, Strongsville, OH (US); Vishakha Chhawchharia, Bangalore (IN); Srikanth Rama, Hyderabad (IN); Nadeem Akhtar, Bangalore (IN); Sameer Leekha, Karnal (IN)

(73) Assignee: Infosys Limited (IN)

( * ) Notice: Subject to any disclaimer, the term of this patent is extended or adjusted under 35 U.S.C. 154(b) by 53 days.

(21) Appl. No.: 13/069,626

(22) Filed: Mar. 23, 2011

(65) Prior Publication Data

US 2012/0047178 A1  Feb. 23, 2012

(30) Foreign Application Priority Data

Jul. 1, 2010 (IN) .............................. 1853/CHE/2010

(51) Int. Cl.
*G06F 17/30* (2006.01)
(52) U.S. Cl.
USPC ........................................................ 705/7.28
(58) Field of Classification Search
USPC ........................................................ 705/7.28
See application file for complete search history.

(56) References Cited

U.S. PATENT DOCUMENTS

| | | | | |
|---|---|---|---|---|
| 2006/0059031 | A1* | 3/2006 | Hertel-Szabadi et al. | 705/10 |
| 2009/0132557 | A1* | 5/2009 | Cohen et al. | 707/100 |
| 2009/0265209 | A1* | 10/2009 | Swaminathan et al. | 705/9 |
| 2010/0179961 | A1* | 7/2010 | Berry et al. | 707/769 |
| 2010/0262444 | A1* | 10/2010 | Atwal et al. | 705/7 |
| 2010/0319067 | A1* | 12/2010 | Mohanty et al. | 726/21 |
| 2010/0324952 | A1* | 12/2010 | Bastos et al. | 705/7 |
| 2011/0112973 | A1* | 5/2011 | Sanghvi | 705/317 |
| 2012/0004945 | A1* | 1/2012 | Vaswani | 705/7.28 |

OTHER PUBLICATIONS

Article entitled "Transformation for Growth and Change: Infosys' IMPACT Framework and Value Realization Method (VRM)", by Infosys, Copyright 2009.*
Article entitled "Government, Risk and Compliance", by Infosys, dated 2008.*

* cited by examiner

*Primary Examiner* — Mahesh Dwivedi
(74) *Attorney, Agent, or Firm* — Lerner, David, Littenberg, Krumholz & Mentlik, LLP (57) ABSTRACT

The present invention provides a method and system for managing various Regulations, Policies and Risks (RPR). These RPR are managed for supporting Governance, Risk and Compliance requirements of an organization. The method includes defining a tree structure for a context. The tree structure is defined for one or more RPR and one or more roles of a plurality of users of the organization. The RPR are intervened across various trees. A plurality of nodes is defined for the tree. Each node includes a plurality of attributes and one or more attribute functions.

17 Claims, 9 Drawing Sheets

METHOD AND SYSTEM FOR MANAGING A PLURALITY OF REGULATIONS, POLICIES AND RISKS

BACKGROUND OF THE INVENTION

The present invention relates to the field of Governance, Risk and Compliance (GRC). More specifically, the present invention relates to a method and system for managing a plurality of Regulations, Policies and Risks (RPR) to support GRC requirements of an organization.

Organizations need to be compliant with various regulations. These regulations are propagated by various regulatory authorities such as state government, local government, and so forth. Examples of these regulations include, but are not limited to, the Sarbanes-Oxley Act (SOX), the Occupational Safety and Health Act (OSHA), the Health Insurance Portability and Accountability Act (HIPAA), and so forth. Some of these regulations are cross-industry regulations while others are specific to an industry. Industry-specific regulations are called industry standards and they usually provide formats and procedures to be followed in order to comply with the standard. Examples of industry standards include, but are not limited to, Good Practices quality guidelines and regulations (GxP), used in many fields, including pharmaceutical and food industries. Organizations also define internal regulations to improve their performance by defining various internal policies, rules, and so forth.

Presently, organizations comply with various regulations and industry standards by managing them individually. For example, if an organization needs to comply with the SOX and the OSHA regulations, then it defines one system for managing the SOX regulation and another system for managing the OSHA regulation. Typically, committees are formed to determine the policies and processes that the organization needs to follow to comply with a regulation. Further, these committees determine various infrastructural needs for the organization to comply with the regulation. Thereafter, a system is set up to handle the compliance requirements. Typically, the systems designed for managing regulations become outdated with updates in the regulations.

The organizations face a number of problems in managing various regulations and industry standards. Typically, the regulations and industry standards are frequently amended by regulatory authorities. In addition, new regulations are frequently propagated by these regulatory authorities. Therefore, new systems need to be designed frequently for managing various regulations. Furthermore, the existing systems need to be upgraded frequently due to amendments in the regulations. The design and up-gradation of these systems is a manual process. In many cases, various regulations and policies have overlapping compliance requirements. Therefore, managing the regulations becomes effort intensive, duplicated, non-standardized, and prone to discrepancies. These organizations need to monitor the compliance processes regularly. However, frequent amendments in the regulations and standards make it difficult for the organizations to continuously monitor these compliance processes.

In light of the discussion above, there is a need for a method, system and computer program product for efficiently managing various regulations. Further, such a method should be standardized and should enable faster adoption to amendments in regulations. Moreover, such a method should enable continuous monitoring of various compliance processes.

SUMMARY OF THE INVENTION

An object of the invention is to efficiently manage various Regulations, Policies and Risks (RPR).

Another object of the invention is to enable faster adoption to amendments in various RPR.

Yet another object of the invention is to provide a standardized method for managing various RPR.

Still another object of the invention is to enable continuous monitoring of various compliance processes.

To achieve the objectives mentioned above, the invention provides a method, system and computer program product for managing a plurality of RPR. These RPR are managed to support Governance, Risk and Compliance (GRC) requirements of an organization. The method includes defining a tree for one or more RPR corresponding to one or more roles of a plurality of roles of the organization. The tree is defined on the basis of a context which describes the application of one or more RPR. The plurality of RPR is intervened across various trees. The tree provides information related to the one or more RPR for defining the application described by the context. The tree includes various nodes, and each node includes various attributes groups that contain the information related to the one or more RPR in relation with the context. Various functions and workflows are associated with each node to manage the plurality of RPR.

The method provides the flexibility of defining various RPR in a standardized structure. The trees can be defined from various predefined tree-types, node-types, and attribute-types. Therefore, the time required for defining various RPR is reduced considerably. The trees can also be easily updated on the basis of updates in the RPR. Hence, amendments in various RPR can be handled efficiently. The method also includes providing information to the users of the tree, thereby assisting in continuous monitoring.

BRIEF DESCRIPTION OF DRAWINGS

Various embodiments of the invention will hereinafter be described in conjunction with the appended drawings, provided to illustrate and not to limit the invention, wherein like designations denote like elements, and in which.

DETAILED DESCRIPTION OF DRAWINGS

The invention describes a method, system and computer program product for managing a plurality of Regulations, Policies and Risks (RPR). The plurality of RPR is managed to support Governance, Risk and Compliance (GRC) requirements of an organization. In various embodiments of the invention, the plurality of RPR is managed for a plurality of roles defined for a plurality of users in the organization.

Figure 1:
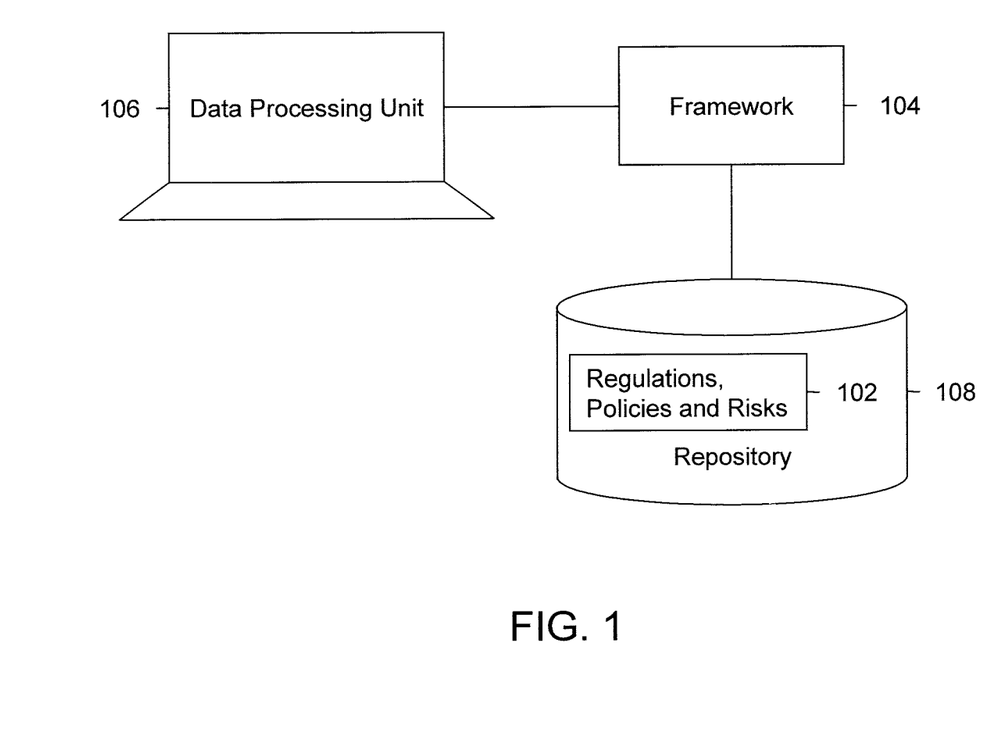
FIG. 1 illustrates an environment in which various embodiments of the invention may be practiced.

FIG. 1 illustrates an environment 100 in which various embodiments of the invention may be practiced. Environment 100 includes a plurality of RPR 102, a framework 104, a Data Processing Unit (DPU) 106, and a repository 108.

An organization needs to manage plurality of RPR 102 to support its GRC requirements. Examples of RPR include, but are not limited to, the Sarbanes-Oxley Act (SOX) regulation, the Occupational Safety and Health Act (OSHA), the Health Insurance Portability and Accountability Act (HIPAA), internal Information security (IS) policies, identified risks for an organization, and so forth. In accordance with various embodiments of the invention, framework 104 is used for managing plurality of RPR 102. Framework 104 may be located on a server that is connected to various DPUs of the organization over a network. Alternatively, framework 104 may be located on DPU 106. Framework 104 may be implemented in the form of software, hardware, firmware, or combinations thereof.

A user of the organization can interact with DPU 106 to manage plurality of RPR 102 through framework 104. Examples of DPU 106 include, but are not limited to, a computer, a laptop, a Personal Digital Assistant (PDA), and so forth. Framework 104 is integrated with repository 108. Typically, repository 108 stores plurality of RPR 102. The user defines and documents various policies, procedures, risks, controls, metrics and programs in order to manage plurality of RPR 102. These policies, procedures, risks, controls, metrics and programs are stored in repository 108.

Figure 2:
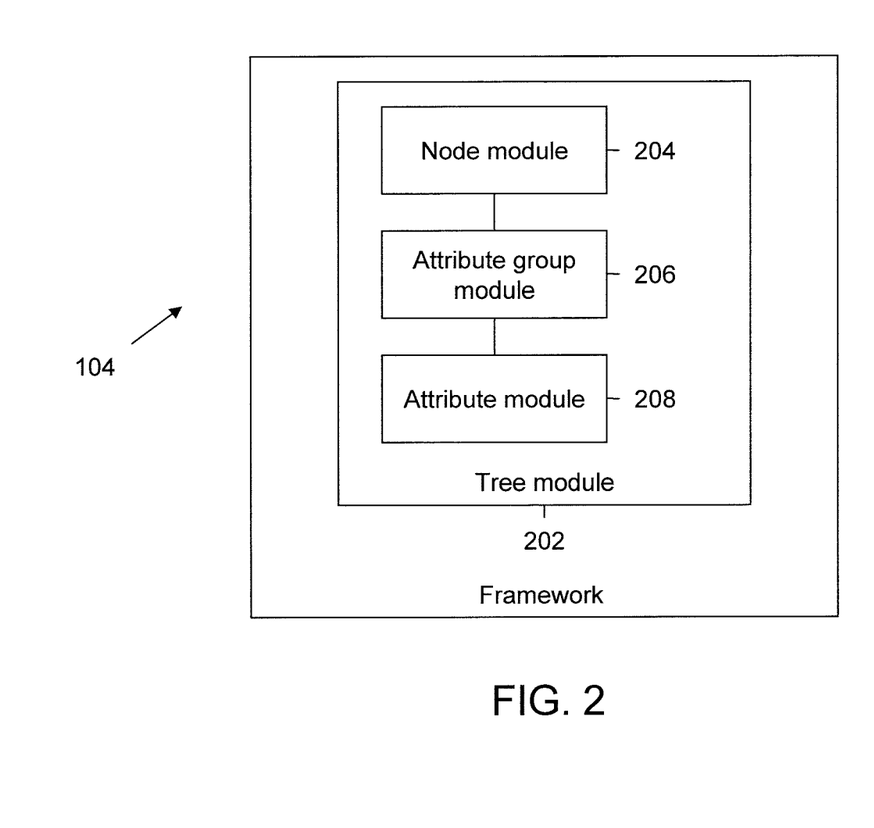
FIG. 2 illustrates a block diagram of a framework for managing a plurality of Regulations, Policies and Risks (RPR), in accordance with an embodiment of the invention.

FIG. 2 illustrates a block diagram of framework 104 for managing a plurality of RPR, in accordance with an embodiment of the invention. Framework 104 includes a tree module 202, a node module 204, an attribute group module 206, and an attribute module 208.

Tree module 202 defines a tree on the basis of a context to manage various RPR corresponding to various roles. The tree includes various nodes, which are defined using node module 204. Further, these nodes include different attribute groups, which are defined using attribute group module 206. These attribute groups include various attributes, which are defined using attribute module 208.

Tree module 202 defines a tree for one or more RPR corresponding to one or more roles. For example, a tree may be defined to manage one or more regulations, such as an IT regulation, a SOX regulation, an OSHA regulation, a HIPAA regulation, and so forth, and is defined corresponding to various managers and senior managers of the organization. The tree is defined on the basis of a context which describes an application area of the one or more RPR. For example, the context may be one of IT management, IP management, HR management, information security, and so forth.

In an embodiment of the invention, the tree is defined using one or more predefined tree-types that have been predefined on the basis of the generic requirements of various RPR for various contexts. The tree-type consists of a hierarchical structure of the node-types. Further, the tree-type includes a parent-child relationship of the node-types. Therefore, a tree-type provides a primary structure for navigation for a given context. The existing trees that have been defined for various contexts may also serve as predefined tree-types while defining a new tree.

Tree module 202 further defines access rights for the tree. In an embodiment of the invention, access rights are defined for the tree to restrict access of the content defined within the tree. For example, access rights are defined for the tree such that the tree can only be accessed by a business unit head.

In various embodiments of the invention, the tree is defined in the form of a data structure, where the tree provides a basic skeleton for the information to be stored in the repository. Each tree includes one or more nodes that maintain the data in an organized manner to be used by one or more roles of the plurality of roles for which the tree has been defined.

The nodes are defined by node module 204. For example, if the context is Sarbanes-Oxley management, then the period, legal entities, processes and sub-processes may be defined as different nodes. In other words, nodes help in defining the RPR for the various entities of the context in the form of a data structure. In an embodiment of the invention, the nodes of a tree may include one or more child nodes. For example, a node defined for the process "Travel" may have two child nodes defined for two sub-processes, namely, "Domestic Travel" and "International Travel".

In an embodiment of the invention, tree module 202 defines access rights for each node to restrict access of the content defined within a node. For example, if a tree can be accessed only by managers and senior managers, then access rights may be defined for the nodes of the tree in such a way that some of the nodes can only be accessed by senior managers and other nodes can be accessed by managers as well as senior managers.

In an embodiment of the invention, the nodes are defined using one or more predefined node-types that have been defined on the basis of the generic requirements of various RPR for various contexts. A node-type is the definition of an object that can exist independently. For example, node-types can be defined for processes, sub-processes, risks, controls, organization units, and so forth. Each node-type includes various attributes definitions. Existing node-types that have been defined for various contexts may also serve as predefined node-types while defining new nodes.

In various embodiments of the invention, the node-types are defined in the form of a data structure, where the node-types provide a basic skeleton for the information to be stored in the repository. Each node-type includes one or more attribute groups that contain the data to be used by various roles for which the node-types have been defined. An instance of a node-type is a node. For example, a node defined for a group manager in a company is an instance of a node-type defined for business unit heads.

Attribute group module 206 defines these attribute groups. Each attribute group includes one or more attributes, which contain description related to the RPR. Each attribute of the one or more attributes includes a set of policies, procedures, assessments, relevant configurable information, events, and reports. For example, if a node is defined for an employee, then the node can include an attribute group for login details of the employee. Further, the attribute group for the login details can include attributes such as, login ID, and password details.

Attribute group module 206 also defines one or more attribute functions for each attribute group. These attribute functions are defined for modifying the content of the attribute groups on the basis of a modification in an RPR.

Attribute module 208 defines each attribute of the one or more attributes. In an embodiment of the invention, the attributes are defined using one or more predefined attribute-types that have been predefined on the basis of the generic requirements of various RPR for various contexts. The existing attributes that have been defined for different nodes may also serve as predefined attribute-types while defining new attributes. Examples of attribute-types include drop boxes, radio buttons, text boxes, and so forth. In an embodiment of the invention, an instance of an attribute-type is an attribute. For example, a text box with the name of an employee can be an attribute, a drop box providing a selection of login and registration can be an attribute, and so forth. In various embodiments of the invention, the attributes are defined in the form of a data structure.

The trees are developed from predefined tree-types, node-types, and attribute-types, which helps in reducing the effort required for building the trees. Further, these trees are intervened, that is, various trees share common nodes. When various trees share common nodes, the attributes defined in the nodes are also shared. The access rights defined for these trees enable selective access and navigation of the common nodes on the basis of the context with which a user enters framework 104. Therefore, the attribute groups and attributes of a node can be accessed by the user only if the user has access rights to access the node.

Figure 3:
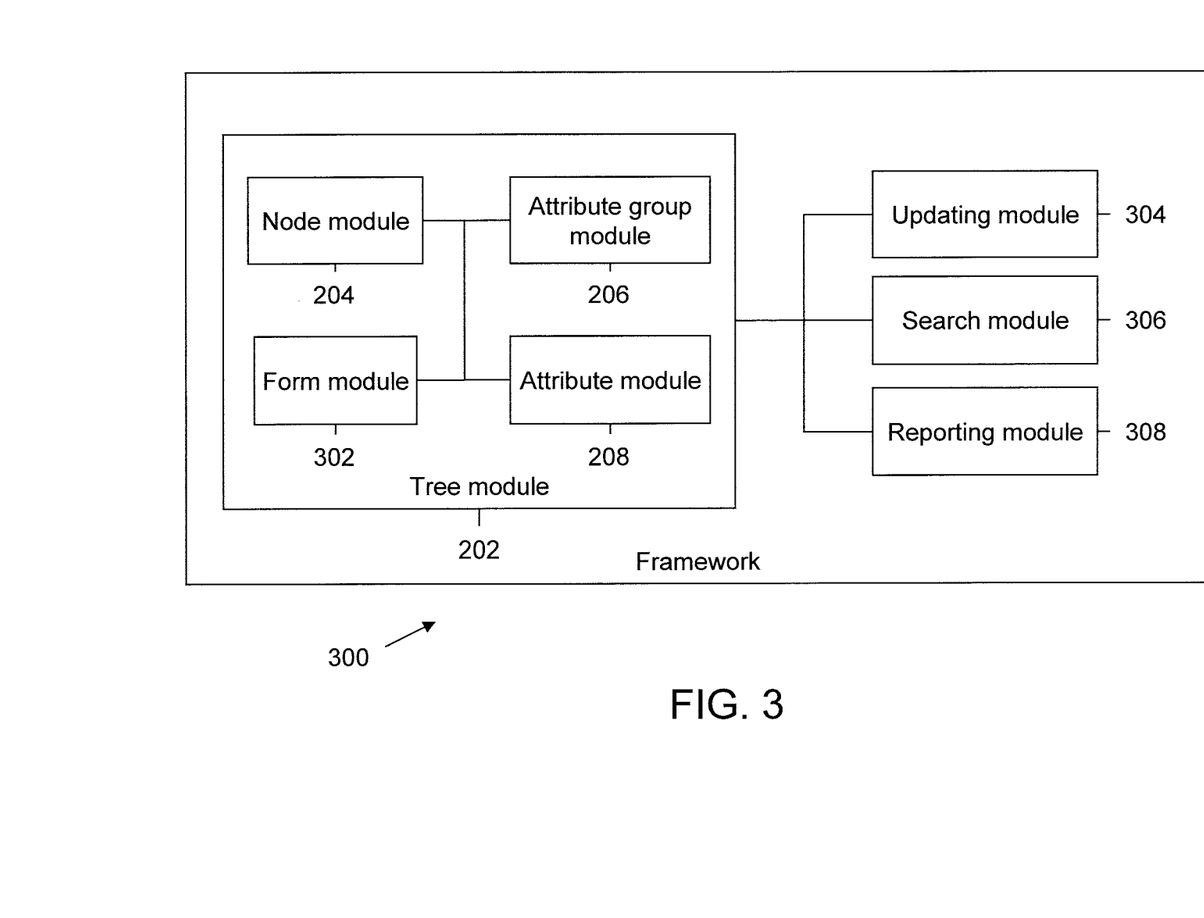
FIG. 3 illustrates a block diagram of the framework for managing the plurality of RPR, in accordance with another embodiment of the invention.

FIG. 3 illustrates a block diagram of a framework 300 for managing a plurality of RPR, in accordance with another embodiment of the invention. To describe framework 300, references will be made to FIG. 2, although it is understood that framework 300 can be implemented with reference to any other suitable embodiment of the invention. Framework 300 includes tree module 202, node module 204, attribute group module 206, attribute module 208, a form module 302, an updating module 304, a search module 306, and a reporting module 308.

Tree module 202 defines a tree for various RPR corresponding to various roles on the basis of a context. The tree includes various nodes that are defined by node module 204. A node includes various attribute groups, which are defined by attribute group module 206. An attribute group includes various attributes, which are defined by attribute module 208. Each node includes various forms, which include one or more attribute groups. Form module 302 defines these forms. The tree defined for a context needs to be updated based on updates in one or more RPR. Updating module 304 updates the tree on the basis of the updates in the corresponding RPR. A user may search within existing nodes and attributes of the defined trees for accessing the information contained therein. Search module 306 searches the defined trees on the basis of the inputs from the user. The tree defined for various roles also provides information related to various RPR to each role, in accordance with the one or more predefined rules. Reporting module 308 provides the information related to various RPR to each role.

Tree module 202 defines a tree for one or more RPR corresponding to one or more roles. The tree is defined on the basis of a context which describes an application area of the one or more RPR. In an embodiment of the invention, the tree is defined using one or more predefined tree-types that have been predefined based on the generic requirements of various RPR for various contexts. Tree module 202 further defines access rights for the tree. In an embodiment of the invention, access rights are defined for the tree to restrict access of the content within the tree. In various embodiments of the invention, the tree is a data structure. Tree module 202 is described in detail in conjunction with the description of FIG. 2.

Node module 204 defines a plurality of nodes of the tree. Nodes contain information related to the RPR and help in defining the RPR for the various requirements of the context in the form of a data structure. In an embodiment of the invention, the nodes of a tree may also include one or more child nodes. Tree module 202 defines access rights for each node. In an embodiment of the invention, access rights are defined for each node to restrict access of the content described within that node. Node module 204 is defined in detail in conjunction with the description of FIG. 2.

Each node includes one or more attribute groups, which contain details related to the RPR. Attribute group module 206 defines these attribute groups. Attribute group module 206 also defines one or more attribute functions for modifying the content of the attribute groups, based on a modification in an RPR. Attribute group module 206 is described in detail in conjunction with the description of FIG. 2.

The information contained in the one or more attribute groups is in the form of attributes. Each attribute group includes one or more attributes, which are defined by attribute module 208. Attribute module 208 is described in detail in conjunction with the description of FIG. 2.

Each node in a tree includes one or more forms. Form module 302 defines these forms on the basis of the plurality of attributes. Each form includes one or more attribute groups. In an embodiment of invention, the form is a tab that is used for displaying, accessing and modifying various attribute groups.

In various embodiments of the invention, the forms are defined in the form of a data structure, where the forms maintain the data related to various attribute groups in an organized manner to be used by the various roles.

The trees defined for various contexts need to be updated on the basis of updates in one or more RPR. Updating module 304 updates at least one tree on the basis of the updates in one or more RPR. For example, if a tree has been defined for IT management, and there is an update in the IT regulation, then updating module 304 updates the tree based on the update in the IT regulation. The tree is updated by modifying its nodes and attributes according to the update in the one or more RPR. Additional nodes may also be inserted into the tree based on the required update.

A user may search within the existing nodes of the defined trees to access or update the trees. Search module 306 searches in the defined trees based on inputs from the user, and one or more tagged attributes. In an embodiment of the invention, the one or more tagged attributes are searchable attributes that are provided by the user while defining the plurality of attributes. These tagged attributes are defined such that a particular set of attributes will be returned if the inputs from the user match with the tagged attributes. In an embodiment of the invention, the input from the user is a search query.

The tree defined for various roles also provides information related to various RPR to each role. The information is provided to the roles by reporting module 308 the basis of one or more predefined rules. The information related to various RPR and data related to the use of these RPR is provided to the corresponding role. Each predefined rule includes functions for providing the information to the role. In an embodiment of the invention, the data related to the use of the RPR is identified from a repository. The repository can be, but is not limited to, a database and an XML. The tree is integrated with the repository, and based on the predefined rules, the data identified from the repository is provided to the corresponding role. For example, if a business unit head needs to observe the monthly use of validation software, then predefined rules may be defined to return the monthly use of the validation software to the business unit head. Reporting module 308 also helps various roles in monitoring the compliance of the organization with various RPR.

Figure 4:
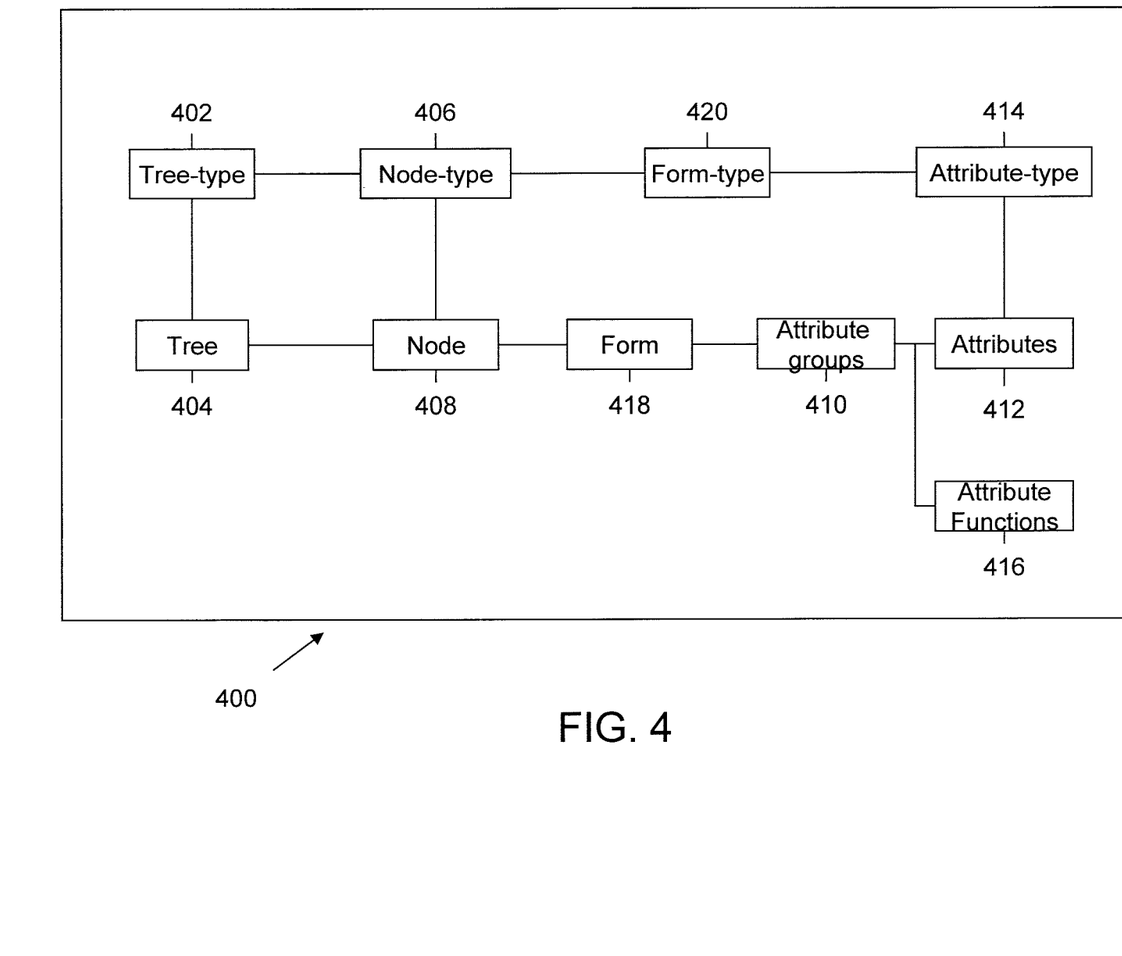
FIG. 4 illustrates a block diagram of the framework for managing the plurality of RPR, in accordance with yet another embodiment of the invention.

FIG. 4 illustrates an exemplary framework 400 for managing a plurality of RPR. To describe exemplary framework 400, references will be made to FIG. 3, although it is understood that exemplary framework 400 can be implemented with reference to any other suitable embodiment of the invention. Exemplary framework 400 includes a tree-type 402, a tree 404, a node-type 406, a node 408, attribute groups 410, attributes 412, attribute-types 414, attribute functions 416, a form 418, and a form-type 420. Although various connections are illustrated in FIG. 3, it will be apparent to any person skilled in the art that these connections illustrate a logical connection between the corresponding elements, and that exemplary framework 400 can include various other types of connections.

Exemplary framework 400 is used for defining various trees for managing various RPR. Tree-type 402 is used for defining tree 404 on the basis of a context for managing various RPR. Tree-type 402 may also be defined by a user to define tree 404 on the basis of the context. Although FIG. 4 includes only one tree-type, it will be apparent to a person skilled in the art that the number of tree-types need not be limited to one. Any tree that is created is added to a library of trees.

Generally, tree-types serve as a skeleton for defining trees and include the relationship between various node-types such as node-type 406. Although FIG. 4 includes only one node-type, it will be apparent to a person skilled in the art that the number of node-types need not be limited to one. Node-types include the definition for a node and are used to define various nodes such as node 408. Although FIG. 4 includes only one node, it will be apparent to a person skilled in the art that the number of nodes need not be limited to one.

Any node that is created is added to a library of nodes. A node is added to tree 404, based on the structure defined in tree-type 402. Node 408 can also be added as a child-node to another node.

Attribute groups 410 are defined for node-type 406 in such a way that they contain details related to the RPR. Attributes groups 410 may be defined to group attributes of attributes 412 together. Attributes 412 are defined on the basis of various attribute-types such as attribute-types 414. Any attribute that is created is added to a library of attributes. Attribute-types 414 are predefined in framework 300. An attribute-type can be of various kinds, for example, a text box, a list box, a document, table, a look-up table, a combo box, and a check box. Various properties of the attribute-type can be configured to define an attribute for a node. Although FIG. 4 includes only one attribute-type, it will be apparent to a person skilled in the art that the number of attribute-types need not be limited to one.

Attribute functions 416 are defined for each attribute group of attribute groups 410. Thereafter, one or more forms, such as form 418, are defined for each node-type 406 in tree-type 402. Forms provide access to view and modify attributes groups 410. Forms may be defined by a user using form-types such as form-type 420. It will be apparent to any person skilled in the art that form-types are defined and used in a way similar to various tree-types, node-types and attribute-types. Although FIG. 4 includes only one form-type, it will be apparent to a person skilled in the art that the number of form-types need not be limited to one.

Figure 5:
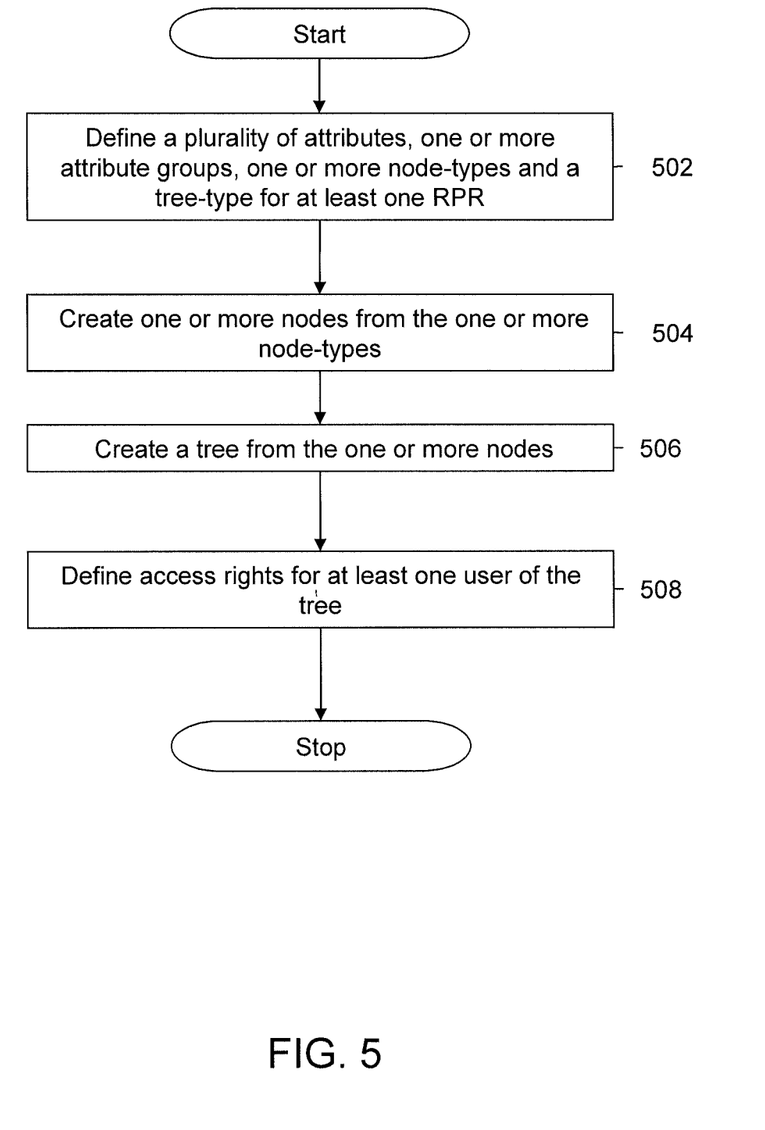
FIG. 5 illustrates a flowchart of a method for managing one or more RPR, in accordance with an embodiment of the invention.

FIG. 5 illustrates a flowchart of a method for managing one or more RPR, in accordance with an embodiment of the invention.

The one or more RPR are managed to support Governance, Risk and Compliance (GRC) requirements of an organization. In various embodiments of the invention, the one or more RPR are managed for one or more roles defined for one or more users in the organization.

At 502, a plurality of attributes is defined for managing at least one RPR of the one or more RPR. The plurality of attributes contain information related to the at least one RPR. Each attribute of the plurality of attributes includes a set of policies, procedures, assessments, relevant configurable information, events, and reports. Examples of attributes include name, contact, phone number, document properties, and so forth.

Thereafter, one or more attribute groups are defined for the plurality of attributes. Each attribute group includes at least one attribute of the plurality of attributes. For example, an attribute group defined for the login details of the employee can include attributes such as, login ID, password details, and the like.

One or more node-types are defined on the basis of the one or more attribute groups. In various embodiments of the invention, the node-types are defined in the form of a data structure, where the node-types provide a basic skeleton for the information to be stored in the repository. Each node-type includes one or more attribute groups that contain the data to be used by the various roles for which the node-types have been defined.

Thereafter, a tree-type is defined on the basis of the one or more node-types. A tree-type defines the primary structure for navigation for a given context. The tree-type consists of a hierarchical structure of the node-types. Further, the tree-type includes a parent-child relationship of the node-types. The existing trees that have been defined for different contexts may also serve as predefined tree-types while defining a new tree.

At 504, one or more nodes are defined. In various embodiments of the invention, the nodes are the instances of node-types. For example, nodes are defined from the node-types defined for Sarbanes-Oxley management, the period, legal entities, processes, sub-processes.

At 506, a tree is defined by logically connecting each node of the one or more nodes. The tree is defined for managing at least one RPR corresponding to at least one role. For example, a tree may be defined for managing one of an IT regulation, a SOX regulation, an OSHA regulation, a HIPAA regulation, and so forth, and is defined corresponding to a manager and a senior manager of the organization. Further, the tree is defined on the basis of a context, which describes an application area of the at least one RPR. For example, the context may be one of IT management, IP management, HR management, internal security, and so forth.

In various embodiments of the invention, the tree is defined in the form of a data structure, where the tree provides a basic skeleton for the information to be stored in the repository. The tree consists of a hierarchical structure of nodes. Further, the tree includes a parent-child relationship of the nodes. Therefore, the tree defines the primary structure for navigation on the basis of the given context. The one or more nodes maintain the data in an organized manner to be used by at least one role for which the tree has been defined.

At 508, access rights are defined for at least one user of the tree. In an embodiment of the invention, access rights are defined to restrict access of the content defined within the tree. For example, access rights are defined for a tree such that it can be accessed only by business unit heads.

Figure 6A:
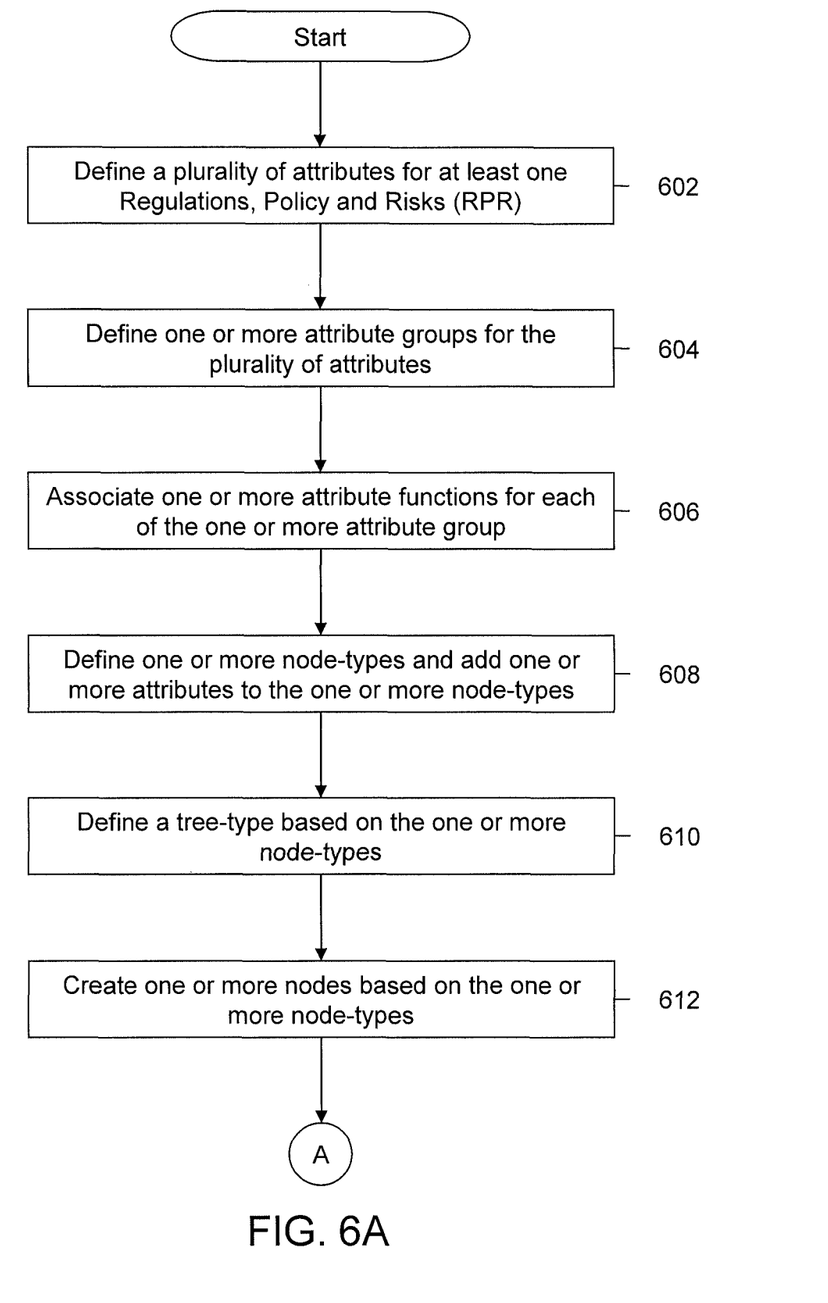
FIGS. 6A and 6B illustrates a flowchart of the method for managing one or more RPR, in accordance with another embodiment of the invention.
Figure 6B:
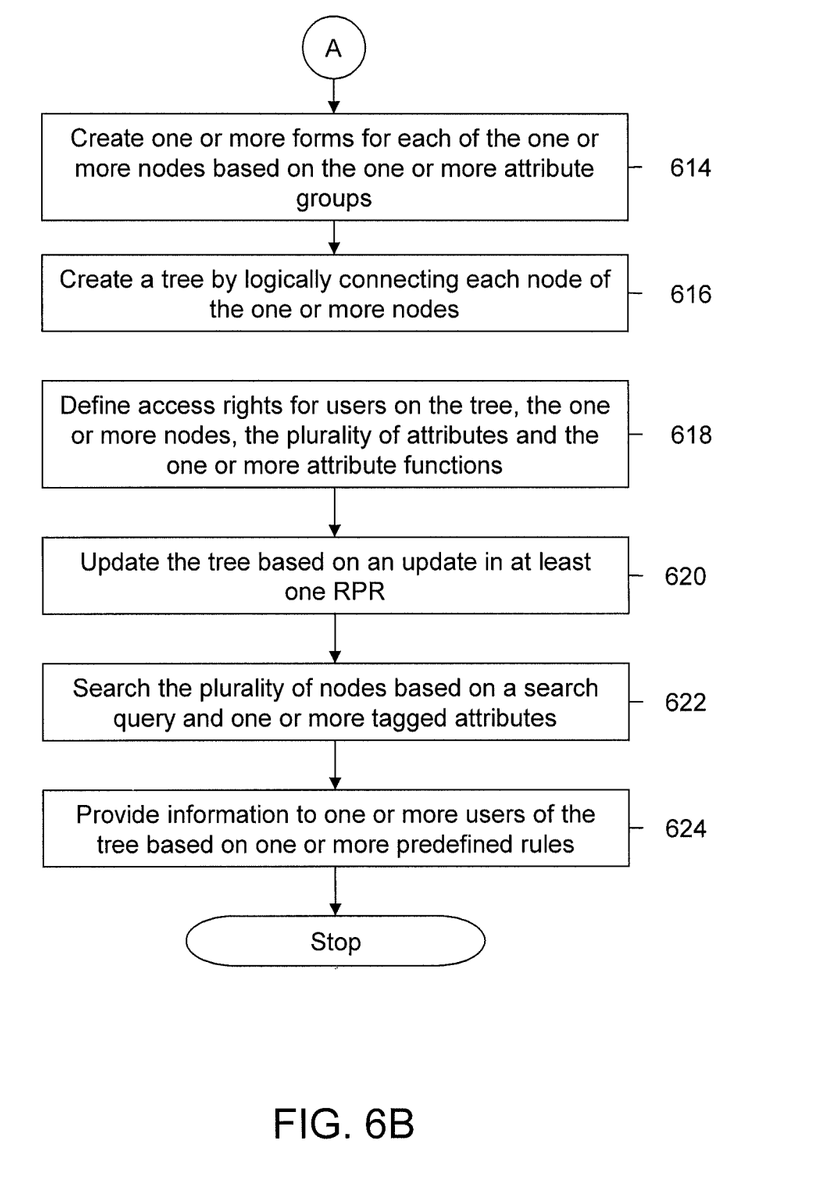

FIGS. 6A and 6B illustrates a flowchart of the method for managing one or more RPR, in accordance with another embodiment of the invention. To describe the method, references will be made to FIG. 3 and FIG. 5, although it is understood that framework 300 can be implemented with reference to any other suitable embodiment of the invention, and that the method described can include fewer or greater number of steps than stated in FIGS. 6A and 6B.

At 602, a plurality of attributes is defined for managing at least one RPR of the one or more RPR. The plurality of attributes contain information related to the at least one RPR. Each attribute of the plurality of attributes includes a set of policies, procedures, assessments, relevant configurable information, events, and reports. Examples of attributes include name, contact, phone number, document properties, and so forth.

In an embodiment of the invention, the plurality of attributes is defined on the basis of one or more predefined attribute-types that have been predefined based on the generic requirements of various RPR for various contexts. The existing attributes that have been defined for different nodes may also serve as predefined attribute-types while defining new attributes. Examples of attribute-types include drop boxes, radio buttons, text boxes, and so forth. In an embodiment of the invention, an instance of an attribute-type is an attribute. For example, a text box that includes the name of an employee can be an attribute, a drop box providing a selection of login and registration can be an attribute, and so forth. In various embodiments of the invention, the attributes are defined in the form of a data structure. In an embodiment of the invention, attribute module 208 defines each attribute.

At 604, one or more attribute groups are defined for the plurality of attributes. Each attribute group includes at least one attribute of the plurality of attributes. For example, an attribute group defined for the login details of an employee can include attributes such as, login ID, password details, and the like. In an embodiment of the invention, attribute group module 206 defines each attribute group.

At 606, one or more attribute functions are defined for each attribute group for modifying the content of the attribute groups on the basis of a modification in an RPR. In an embodiment of the invention, attribute group module 206 defines each attribute function.

At 608, one or more node-types are defined. Thereafter, one or more attributes of the plurality of attributes are added to each of the one or more node-types. In various embodiments of the invention, the node-types are defined in the form of a data structure, where the node-types provide a basic skeleton for the information to be stored in the repository. Each node-type includes one or more attribute groups that contain the data to be used by the various roles for which the node-types have been defined.

At 610, a tree-type is defined on the basis of the one or more node-types. A tree-type defines the primary structure for navigation for a given context. The tree-type consists of a hierarchical structure of the node-types. Further, the tree-type includes a parent-child relationship of the node-types. The existing trees that have been defined for different contexts may also serve as predefined tree-types while defining a new tree.

At 612, one or more nodes are defined on the basis of the one or more node-types Nodes are the instances of node-types, and help in defining the at least one RPR. Each node includes at least one form of the one or more forms, which in turn includes one or more attribute groups that contain the data to be used by various roles.

Nodes help in defining the RPR in the form of a data structure, where the nodes provide a basic skeleton for the information to be stored in a repository. In an embodiment of the invention, the nodes may also include one or more child nodes. For example, a node defined for the process "Travel" may include two child nodes for two sub-processes, namely, "Domestic Travel" and "International Travel".

In an embodiment of the invention, the one or more nodes are defined on the basis of one or more predefined node-types that have been predefined, based on the generic requirements of various RPR for various contexts. A node-type is a definition of an object that can exist independently. Examples of node-types include, but are not limited to, processes, sub-processes, risks, controls, and organization units. Each node-type includes various attributes definitions. The existing nodes that have been defined for different contexts may also serve as predefined node-types while defining new nodes. In an embodiment of the invention, node module 204 defines the one or more nodes.

At 614, one or more forms are defined for each node. These forms are defined on the basis of the one or more attribute groups. Each form includes one or more attribute groups. In an embodiment of invention, the form is a tab that is used for displaying, accessing and modifying various attribute groups. In an embodiment of the invention, form module 302 defines each form of the one or more forms.

At 616, a tree is defined by logically connecting each node of the one or more nodes. The tree is defined for managing at least one RPR corresponding to at least one role. For example, a tree may be defined for managing one of an IT regulation, a SOX regulation, an OSHA regulation, a HIPAA regulation, and so forth, and is defined corresponding to a manager and a senior manager of the organization. Further, the tree is defined on the basis of a context, which describes an application area of the at least one RPR. For example, the context may be one of IT management, IP management, HR management, internal security, and so forth.

In an embodiment of the invention, the tree is defined on the basis of one or more predefined tree-types that have been predefined, based on the generic requirements of various RPR for various contexts. A tree-type defines the primary structure for navigation for a given context. The tree-type consists of a hierarchical structure of the node-types. Further, the tree-type includes a parent-child relationship of the node-types. The existing trees that have been defined for different contexts may also serve as predefined tree-types while defining a new tree.

In various embodiments of the invention, the tree is defined in the form of a data structure, where the tree provides a basic skeleton for the information to be stored in the repository. The nodes of the tree maintain the data in an organized manner to be used by at least one role for which the tree has been defined. In an embodiment of the invention, tree module 202 defines the tree.

At 618, access rights are defined for the tree, the one or more nodes, and the plurality of attributes. In an embodiment of the invention, access rights are defined for the tree to restrict access of the content defined within the tree. For example, access rights are defined for the tree such that the tree can only be accessed by a business unit head.

Access rights are defined for each node to restrict access of the content defined within that node. For example, if a tree can be accessed by only managers and senior managers, then access rights may be defined for the nodes of the tree in such a way that some of the nodes can only be accessed by senior managers, while other nodes can be accessed by managers as well as senior managers. A user of the tree can access the forms and the corresponding attribute groups only if the user has access rights for the node.

The trees are developed from predefined tree-types, node-types and attribute-types, which help in reducing the effort required for building the trees. Further, these trees are intervened, that is, various trees share common nodes. When various trees share common nodes, the attributes defined in the nodes are also shared. The access rights defined for these trees enable selective access and navigation of the common nodes on the basis of the context with which a user enters framework 104.

At 620, the tree is updated on the basis of updates in at least one RPR. In an embodiment of the invention, updating module 304 updates the tree. For example, if a tree has been defined for IT management, and there is an update in the IT regulation, then the tree is updated, based on the update in the IT regulation. The tree is modified by modifying its nodes. Additional nodes may also be inserted into the tree based on the required modification.

At 622, the plurality of nodes is searched on the basis of inputs from a corresponding user and one or more tagged attributes. In an embodiment of the invention, the corresponding user is one of the one or more users for whom the tree is defined. In an embodiment of the invention, the one or more tagged attributes are searchable attributes that are provided by the user while defining the plurality of attributes. These tagged attributes are defined such that a particular set of attributes will be returned if the inputs from the user match with the tagged attributes. In an embodiment of the invention, the input from the user is a search query. In an embodiment of the invention, search module 306 searches the defined trees on the basis of the inputs from the user.

At 624, information related to at least one RPR and data related to the use of the RPR is provided to at least one user of the tree based on one or more predefined rules. Each predefined rule includes functions for providing the information related to the at least one RPR to the corresponding role. In an embodiment of the invention, the data related to the use of the RPR is identified from a repository. The repository can be, but is not limited to, a database and an XML. The tree is integrated with the repository, and based on the predefined rules, the data identified from the repository is provided to the corresponding role. For example, if a business unit head needs to observe the monthly use of validation software, then predefined rules may be defined for returning the monthly use of the validation software to the business unit head. The data related to the use of the RPR aids the user in monitoring the compliance of the organization with at least one RPR. In an embodiment of the invention, the information related to at least one RPR and data related to the use of the RPR is provided to the corresponding role by reporting module 308.

Figure 7A:
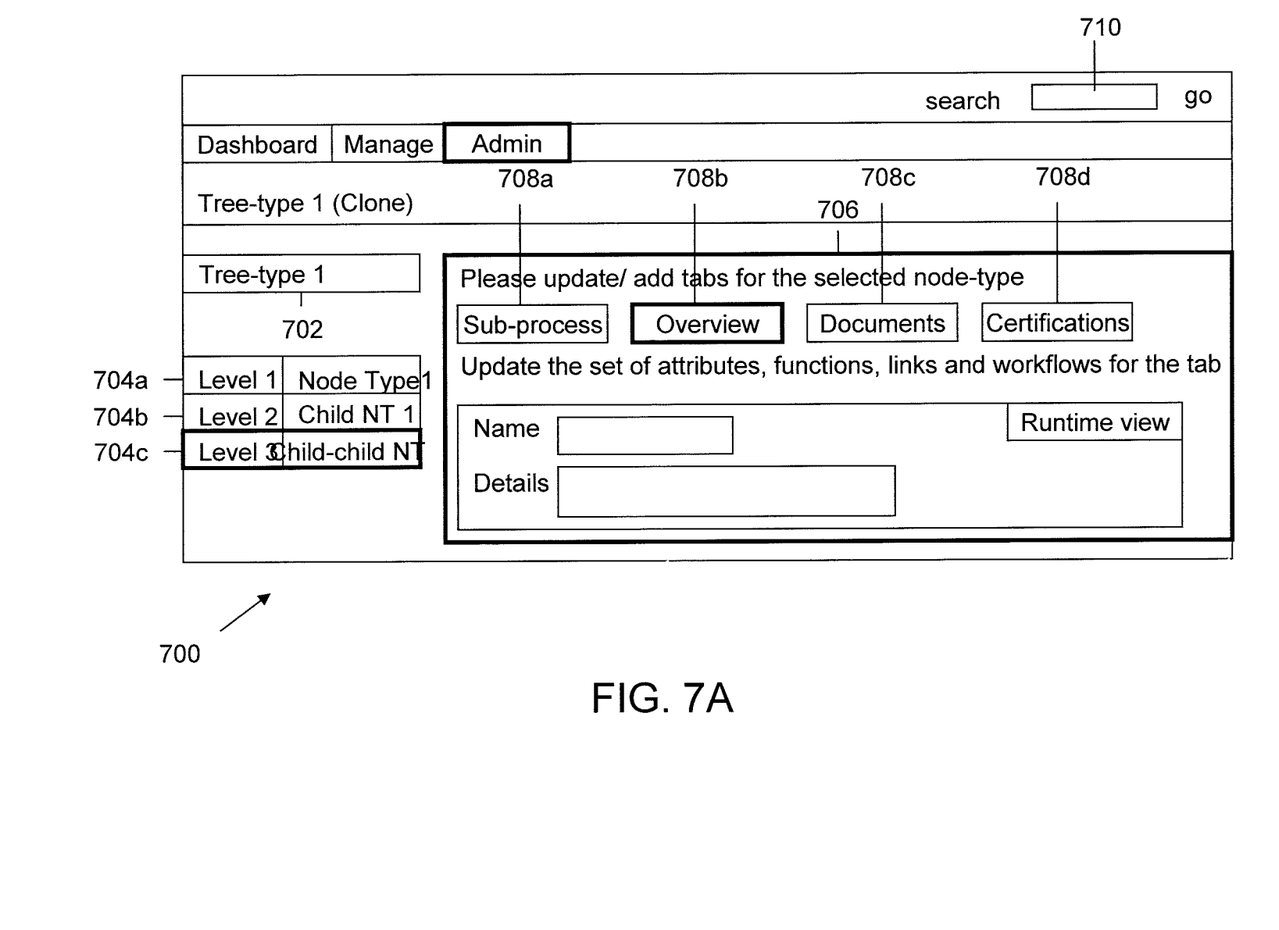
FIGS. 7A and 7B illustrates an exemplary User Interface (UI) for managing the plurality of RPR.
Figure 7B:
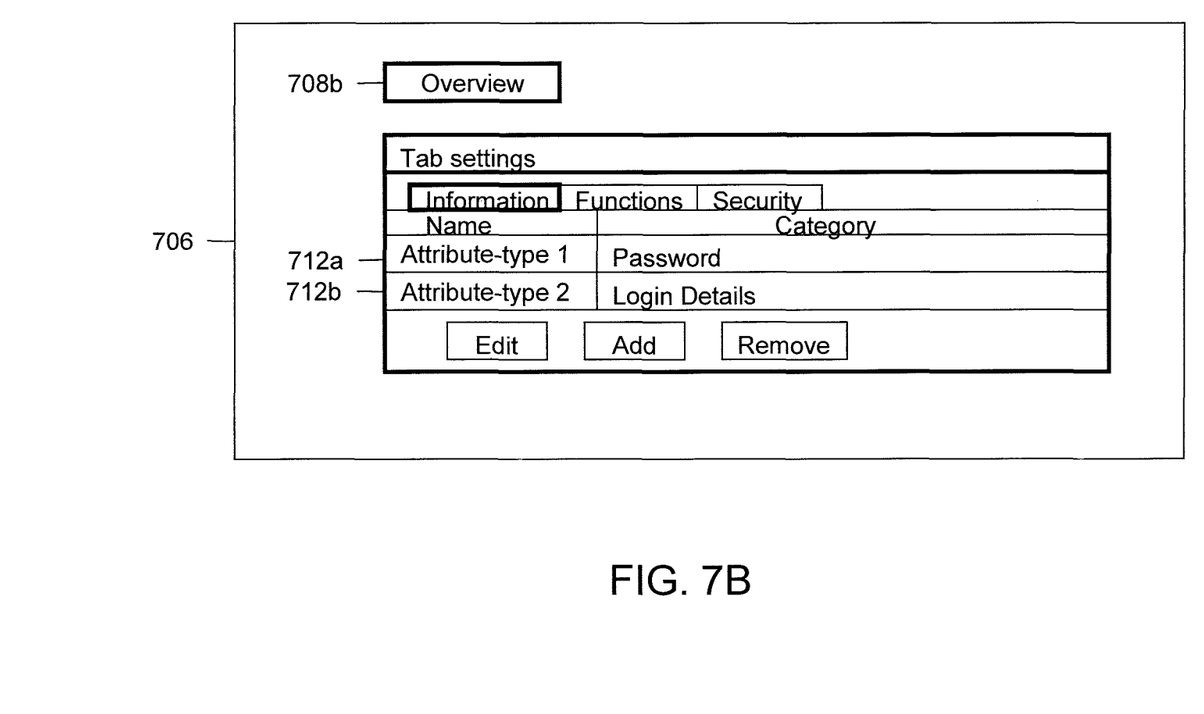

FIGS. 7A and 7B illustrates an exemplary User Interface (UI) 700 for managing a plurality of RPR. To describe exemplary UI 700, references will be made to FIG. 3 and FIG. 5, although it is understood that framework 104 and the method for managing the plurality of RPR can also be implemented with reference to any other suitable embodiment of the invention. Exemplary UI 700 includes a tree-type 702, node-types such as node-type 704a, 704b and 704c, a tab 706, forms 708a, 708b, 708c and 708d, a search tab 710, and attribute-types 712a and 712b.

A user can use exemplary UI 700 to access, define or modify a tree for a context. The user can define the tree for various RPR corresponding to one or more roles. The user can define the tree from predefined tree-types, such as tree-type 702. Although exemplary UI 700 is shown to include one predefined tree-type, it should be apparent to any person skilled in the art that the number of predefined tree-types need not be limited to one. The user can further define access rights for the tree using exemplary UI 700. For the purpose of this part of the description, the user is an administrator of the exemplary UI 700.

The predefined tree-type includes predefined node-types such as node-type 704a, 704b and 704c that can be used for defining root nodes and child nodes for the tree. Node-types may also be defined for the tree on the basis of the requirements of the RPR using exemplary UI 700. Node-type 704a is used for defining a root node, and it includes node-type 704b and node-type 704c for defining child nodes to the root node. The user may define a root node for a process that is a part of the application described by the context using node-type 704a. The user may define child nodes to the root node as a sub-process of the process described by the context using node-type 704b and 704c. The user can define access rights for each node using exemplary UI 700. Although exemplary UI 700 is shown to include three predefined node-types, it should be apparent to a person skilled in the art, that the number of predefined node-types need not be limited to the number of predefined node-types shown in FIG. 7A.

When the user clicks on node-type 704c, the user sees tab 706 that displays forms 708a, 708b and 708c, name and description of the sub-process. When the user clicks on a form, a detailed view of the selected form is displayed. Exemplary UI 700 provides the option of accessing, defining or modifying the content of forms, thereby enabling the user to modify the nodes of the tree. Although exemplary UI 700 is shown to include three forms, it should be apparent to any person skilled in the art the number of forms need not be limited to the number of forms shown in FIG. 7A.

Exemplary UI 700 enables the user to search within the existing nodes of the tree. In order to search within the existing nodes, the user needs to provide inputs for searching through search tab 710.

When the user clicks on a form, exemplary UI 700 provides a detailed view of the corresponding form. The detailed view indicates the attribute-types and the attribute groups that have been defined for the form. Exemplary UI 700 also enables a user to access, define or modify attribute-types such as attribute-types 712a and 712b defined for each node. The attribute-types can be used for defining the attributes and attribute groups for various nodes. The user can add, edit or delete attribute-types by using exemplary UI 700. Although exemplary UI 700 is shown to include two attribute-types, it should be apparent to any person skilled in the art the number of attribute-types need not be limited to the number of attribute-types shown in FIG. 7B.

The method and system described above have several advantages. The method includes defining a tree for a context. The tree is defined for various RPR and roles. Thus, the method provides the flexibility of defining various RPR in a standardized structure. The trees can be defined from predefined tree-types, node-types and attribute-types. Therefore, the time required for defining various RPR is reduced considerably. The trees can also be updated on the basis of updates in the RPR. Therefore, amendments in various RPR can be handled efficiently. The method also includes providing information to users of the tree, thereby assisting in continuous monitoring.

The system for managing a plurality of RPR for supporting GRC requirements of an organization or any of its components may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

The invention claimed is:

1. A framework based on a meta-model architecture for managing a plurality of Regulations, Policies and Risks (RPR), the plurality of RPR being managed to support Governance, Risk and Compliance (GRC) requirements of an organization, the plurality of RPR being managed for a plurality of roles of a plurality of users in the organization, the framework comprising:
   a. a tree module in communication with a microprocessor and operative to define a tree based on a context, the tree being defined for one or more RPR of the plurality of RPR and one or more roles of the plurality of roles, the context describing an application of the one or more RPR, the plurality of RPR being intervened across one or more trees, the tree module comprising:
      i. a node module in communication with the microprocessor and operative to define a plurality of nodes for each tree, each node of the plurality of nodes being defined based on the context, wherein the one or more nodes are defined on basis of one or more node-types such that a node is an instance of a node-type, further wherein the one or more node-types are defined in form of a data structure;
      ii. a tree-type module in communication with the microprocessor and operative to define a tree-type in form of a data structure and on basis of the one or more node-types, the tree-type comprising a hierarchical structure of the node-types, the tree-type further comprising a parent-child relationship of the node-types;
      iii. an attribute group module in communication with the microprocessor and operative to define one or more attribute groups for each node, each attribute group of the one or more attribute groups comprising one or more attributes;
      iv. an attribute module in communication with the microprocessor and operative to define the one or more attributes, the one or more attributes for managing the at least one RPR, each attribute of the one or more attributes comprising information related to the at least one RPR and is one of: a name, a password, a phone number, a login ID, and a contact address, wherein the plurality of attributes are defined on basis of attribute-types that are based on requirements of the at least one RPR, the attribute-types comprising drop boxes, radio buttons, and text boxes; and
   b. a report module in communication with the microprocessor and operative to monitor compliance of the organization with the at least one RPR by providing reports related to the at least one RPR to the one or more users in the organization.

2. The framework of claim 1, wherein the tree module defines the tree based on one or more of predefined tree-types, node-types and attribute-types, the one or more predefined tree-types, node-types and attribute-types being used for defining the one or more trees across the plurality of RPR.

3. The framework of claim 1, wherein the attribute group module is further operative to define one or more attribute functions for each attribute group, each of the one or more attribute functions defines the modifications required in the attribute group based on a modification in at least one RPR of the plurality of RPR.

4. The framework of claim 1 further comprising a form module, the form module in communication with the microprocessor and operative to define one or more forms for the plurality of nodes, each node comprising at least one form, each form of the one or more forms comprising at least one attribute group.

5. The framework of claim 1 further comprising an updating module, the updating module in communication with the microprocessor and operative to update at least one tree of the one or more trees based on the updates in one or more RPR of the plurality of RPR.

6. The framework of claim 1, wherein access rights are assigned to each tree, each node, and each attribute, the access rights being assigned based on the one or more roles for the tree.

7. A computer-implemented method for managing one or more Regulations, Policies and Risks (RPR) in a tree structure, the one or more RPR being defined to support Governance, Risk and Compliance (GRC) requirements of an organization, the one or more RPR being managed for one or more roles of one or more users in the organization, the method comprising:
   a. defining, using program instructions executed by the microprocessor, a plurality of attributes for managing the at least one RPR, each attribute of the plurality of attributes comprising information related to the at least one RPR and is one of: a name, a password, a phone number, a login ID, and a contact address, wherein the plurality of attributes are defined on basis of attribute-types that are based on requirements of the at least one RPR, the attribute-types comprising drop boxes, radio buttons, and text boxes;
   b. defining, using program instructions executed by the microprocessor, one or more attribute groups for the plurality of defined attributes, each attribute group of the one or more attribute groups comprising at least one of the plurality of attributes;

c. defining, using program instructions executed by the microprocessor, one or more nodes based on the one or more attribute groups, each node of the one or more nodes comprising at least one of the one or more attribute groups, wherein the one or more nodes are defined on basis of one or more node-types such that a node is an instance of a node-type, further wherein the one or more node-types are defined in form of a data structure;

d. defining, using program instructions executed by a microprocessor, a tree-type in form of a data structure and on basis of the one or more node-types, the tree-type comprising a hierarchical structure of the node-types, the tree-type further comprising a parent-child relationship of the node-types;

e. defining, using program instructions executed by a microprocessor, a tree by logically connecting each node of the one or more nodes based on application area of the at least one RPR and the at least one role of the one or more roles; and f. monitoring, using program instructions executed by the microprocessor, compliance of the organization with the at least one RPR by providing reports related to the at least one RPR to the one or more users in the organization.

8. The method of claim 7, wherein the tree is defined based on one or more of predefined tree-types, node-types and attribute-types, the one or more predefined tree-types, node-types and attribute-types being used for defining one or more trees across the one or more RPR.

9. The method of claim 7 further comprising defining, using program instructions executed by the microprocessor, one or more attribute functions for each attribute group, each attribute functions of the one or more attribute function defines the modifications required in at least one attribute of the plurality of attributes based on a modification in at least one of the one or more RPR.

10. The method of claim 7 further comprising defining, using program instructions executed by the microprocessor, one or more forms for the one or more nodes, each node comprising at least one of the one or more forms, each form of the one or more forms comprising at least one of the one or more attribute groups.

11. The method of claim 7 further comprising updating, using program instructions executed by the microprocessor, the tree based on the updates in the at least one RPR of the one or more RPR.

12. The method of claim 7 further comprising providing, using program instructions executed by the microprocessor, information to at least one user of the one or more users from the tree based on one or more predefined rules.

13. A computer program product comprising a non-transitory computer-readable medium having computer readable program code embodied therein for managing one or more Regulations, Policies and Risks (RPR) in a tree structure, the one or more RPR being defined to support Governance, Risk and Compliance (GRC) requirements of an organization, the one or more RPR being managed for one or more roles of one or more users in the organization, the computer readable program code comprising instructions that, when executed by a microprocessor, cause the microprocessor to:

a. define a plurality of attributes for managing the at least one RPR, each attribute of the plurality of attributes comprising information related to the at least one RPR and is one of: a name, a password, a phone number, a login ID, and a contact address, wherein the plurality of attributes are defined on basis of attribute-types that are based on requirements of the at least one RPR, the attribute-types comprising drop boxes, radio buttons, and text boxes;

b. define one or more attribute groups for the plurality of defined attributes, each attribute group comprising at least one of the plurality of attributes;

c. define one or more nodes based on the one or more attribute groups, each node comprising at least one of the one or more attribute groups, wherein the one or more nodes are defined on basis of one or more node-types such that a node is an instance of a node-type, further wherein the one or more node-types are defined in form of a data structure;

d. define, using program instructions executed by a microprocessor, a tree-type in form of a data structure and on basis of the one or more node-types, the tree-type comprising a hierarchical structure of the node-types, the tree-type further comprising a parent-child relationship of the node-types;

e. define, using program instructions executed by a microprocessor, a tree by logically connecting each node of the one or more nodes based on application area of the at least one RPR and the at least one role of the one or more roles; and f. monitor, using program instructions executed by the microprocessor, compliance of the organization with the at least one RPR by providing reports related to the at least one RPR to the one or more users in the organization.

14. The computer program product of claim 13, wherein the computer readable program code further comprises instructions that, when executed by the microprocessor, cause the microprocessor to define one or more attribute functions for each attribute group, wherein each of the one or more attribute functions defines the modifications required in at least one of the plurality of attributes based on a modification in at least one of the one or more RPR.

15. The computer program product of claim 13, wherein the computer readable program code further comprises instructions that, when executed by the microprocessor, cause the microprocessor to define one or more forms for each node, each form of the one or more forms comprising at least one of the one or more attribute groups.

16. The computer program product of claim 13, wherein the computer readable program code further comprises instructions that, when executed by the microprocessor, cause the microprocessor to update the tree based on the updates in the at least one RPR of the one or more RPR.

17. The computer program product of claim 13, wherein the computer readable program code further comprises instructions that, when executed by the microprocessor, cause the microprocessor to provide information to at least one of the one or more users from the tree based on one or more predefined rules.

* * * * *